Dec. 26, 1961  E. M. MAGEE  3,014,969
OXIDATION OF GASEOUS HYDROCARBONS TO FORMALDEHYDE
Filed May 18, 1959

*INVENTOR.*
ELLINGTON M. MAGEE,
BY Frank S. Troidl
ATTORNEY.

United States Patent Office

3,014,969
Patented Dec. 26, 1961

3,014,969
OXIDATION OF GASEOUS HYDROCARBONS
TO FORMALDEHYDE
Ellington M. Magee, North Plainfield, N.J., assignor, by mesne assignments, to Esso Research and Engineering Company, Elizabeth, N.J., a corporation of Delaware
Filed May 18, 1959, Ser. No. 813,955
3 Claims. (Cl. 260—604)

This invention relates to the partial oxidation of gaseous hydrocarbons. More particularly, this invention relates to the production of commercially usable quantities of formaldehyde from gaseous hydrocarbons.

The most common gaseous hydrocarbon is methane. Hence, if commercially usable quantities of formaldehyde can be produced from a feed containing methane, such formaldehyde could be very cheaply supplied. However, methane is very unreactive in nature. At the temperatures required for active reaction between methane and oxygen, the desired formaldehyde product is thermodynamically unstable.

A further difficulty encountered in the attempted oxidation of methane is the fact that the formaldehyde is oxidized to by-products, such as carbon monoxide and carbon dioxide. Hence, the yields of formaldehyde from the partial oxidation of methane in general are very low.

Because of the low cost of methane, a process for producing formaldehyde from methane is highly desirable. Using the process described herein, formaldehyde can be produced from methane in commercially usable quantity. However, it is to be understood that the process is equally applicable to the production of formaldehyde from higher gaseous hydrocarbons.

The invention is a new and useful process for producing a commercially economical yield of formaldehyde from a feed stock of gaseous hydrocarbons consisting entirely of methane. The yield of formaldehyde obtained from using this process is sufficiently high, and the selectivity is sufficiently great to warrant the use of this process commercially in view of the low cost involved.

Briefly described, the process includes the addition of halogen, halogen acid, or a halogen-containing compound to a stream of gaseous hydrocarbons. The resulting gases are thereafter mixed with a gas containing free oxygen. The mixture is then passed to a reactor, the walls of which are covered with a coating of lead oxide, and heated to partially oxidize the hydrocarbons into gaseous products, including formaldehyde. The formaldehyde is then recovered for use. If desired, the unused hydrocarbons may be recycled.

Figure 1:
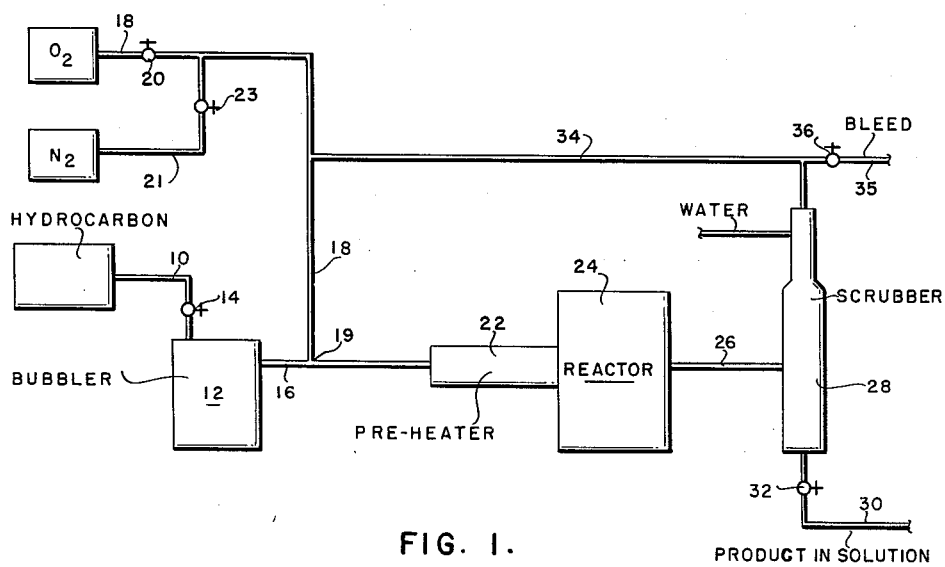
Figure 2:
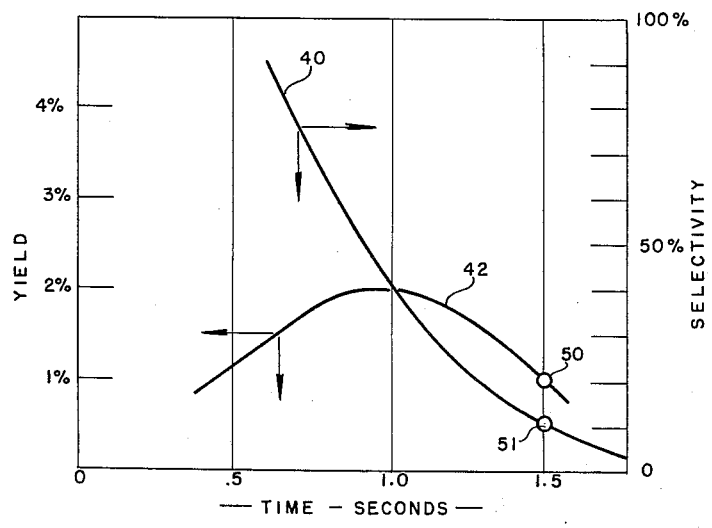

The invention, as well as its many advantages, will be further understood by reference to the following detailed description and drawings, in which:

FIG. 1 is a schematic flow diagram showing one manner in which my new process is carried out; and FIG. 2 is a graph useful in explaining the manner in which the process is carried out.

Referring to FIG. 1, a feed, which may consist entirely of methane, is conducted through pipe 10 to a bubbler 12. The flow of feed is controlled by means of a valve 14 in pipe conduit 10.

The bubbler 12 contains the halogen, halogen acid, or halogen-containing compound. For example, the bubbler 12 may contain a concentrated solution of hydrochloric acid in water (37.4% HCl) held at 32° F. by an ice bath.

The feed is thus bubbled into the halogen, halogen acid, or halogen-containing compound in bubbler 12. The resulting gases are conducted through gas conduit 16.

The free-oxygen containing gas, such as air or oxygen, is conducted through gas conduit 18 under control of valve 20.

If desired, an inert gas such as nitrogen can be mixed with the oxygen. For this purpose, a gas conduit 21 controlled by valve 23 is provided in the system. A controlled amount of nitrogen can be conducted through conduit 21 and mixed with the oxygen flowing through conduit 18.

The flow of gases through gas conduits 16 and 18 are controlled to provide the proper ratio of methane with respect to oxygen. It has been found that methane to oxygen ratios ranging from 1 to 20 are suitable. If the methane to oxygen ratio is below 1, the system may start to burn. If the methane to oxygen ratio is above 20, the amount of oxygen would be too little, and so little of the methane would be converted to formaldehyde as to make the process commercially impractical.

The methane which has passed through bubbler 12, the oxygen, and, if included, nitrogen, are mixed together at the junction 19 of gas conduit 18 and gas conduit 16. The mixture of gases flowing through gas conduit 16 is conducted to a preheater 22. In the preheater 22, the mixture is preheated to the desired reaction temperature. The mixture is then caused to react in reactor 24 and the hydrocarbons oxidized into gaseous products, including the desired formaldehyde.

The reactor 24 is of a particular construction in that it is provided with surfaces which are covered with a lead oxide coating in a suitable manner. These lead oxide coated surfaces are contacted by the mixture of gases during the reaction.

The gases from the reactor 24 are conducted through gas conduit 26 to a water scrubbing system illustrated by scrubber 28. The desired intermediate products, including formaldehyde, are thus passed into solution with the water. The product may be removed from the scrubber 28 through liquid conduit 30 under control of valve 32. The unused methane may be recycled to conduit 18 by means of gas conduit 34. A bleed line 35, controlled by valve 36, is provided for removal of some of the product gases making room for fresh feed.

The graph shown in FIG. 2 represents typical curves of selectivity and yield of $CH_2O$ with respect to the time of reaction. In the oxidation of methane to formaldehyde, the selectivity curve varies from 100% formaldehyde at very short reaction times to close to 0 at longer reaction times, as indicated by curve 40 in FIG. 2. The yield of formaldehyde increases with reaction time to a maximum and then decreases as more and more formaldehyde decomposes into the unwanted carbon monoxide and carbon dioxide by-products. The selectivity is defined as $$\frac{\text{Moles } CH_2O}{\text{Moles } CH_2O + \text{moles } CO + \text{moles } CO_2} \times 100$$

The yield is based on methane and is equal to $$\text{Yield (percent)} = \frac{\text{moles } CH_2O}{\text{moles feed } CH_4} \times 100$$

Both the yield and the selectivity are important in the process. If the selectivity is fairly high at the point of greatest yield a smaller portion of the essential $CH_4$ fed into the process is converted to carbon monoxide and carbon dioxide than if the selectivity is low. This means that a greater portion of the methane is left unreacted and can be recycled so that the ultimate product is greater with a higher selectivity even though the yield per pass may be the same. Looking at FIG. 2, it can be seen by examination of curve 42 that a yield of around 2%, using my new process, can be obtained with a reaction time ranging from .7 to 1.3 seconds. The selectivity with the .7 to 1.3 seconds reaction time will range from around 60% to 20%, the higher selectivity occurring with the shorter reaction time. Though the yield may appear low, the high selectivity which permits the unused methane gas to be recycled provides a completely feasible process using methane as the entire feed.

A mixture of $O_2$ and $N_2$, containing 29% and 71% of the gases respectively, was mixed with pure methane to give a mixture of 31.6% $CH_4$, 19.9% $O_2$, and $N_2$ to give 100%. The methane was not passed through the bubbler 12 shown in FIG. 1 so that the gases contained no HCl. The gases were allowed to flow at a rate such that the residence time in the reactor 24, held at 1100° F., was about 1.5 seconds. The exit gases from the scrubber 28 (the scrubber was held at 32° F.), were analyzed. At this temperature and residence time, no reaction took place and no formaldehyde was produced.

Another test was made in which the methane was allowed to bubble through concentrated hydrochloric acid (37.4% HCl in water) contained in bubbler 12 held at 32° F. The $O_2$, $CH_4$, and $N_2$ concentrations were essentially the same as in the test in which no HCl was used. Likewise, the reactor temperature and residence time were the same. It was found, however, that when the HCl was added to the gas stream in amounts ranging from 0.1 to 5% by volume of the total gas volume including $CH_4$, $O_2$, and $N_2$, reaction took place at 1100° F. and at a residence time of 1.5 seconds, whereas no reaction was found previously. The yield of formaldehyde was 0.93%. The selectivity was 9.8%, indicating that higher overall yields can be obtained by recycling the scrubbed mixture. Still higher yields and selectivities may be obtained by using shorter contact times, as indicated by FIG. 2. The maximum yield depends upon the temperature of reaction, methane and oxygen concentrations, and HCl concentration. The temperature of the reaction ranges from 900° to 1300° F. The methane to oxygen ratios range from 1 to 20 with the total concentration of methane plus oxygen ranging from 20 to 100%. A smaller total concentration results in an overall yield which is too small. The HCl concentration can range from 0.05 to 5% of total gas volume and provide completely stable yields of formaldehyde from methane. Higher concentrations of HCl do not increase the yield appreciably.

Formaldehyde can be produced by the partial oxidation of methane without the addition of HCl. However, in order to do this, the reaction temperature must be raised considerably higher. The yield and selectivity of formaldehyde is also lower than the yield and selectivity with the inclusion of the HCl in combination with the lead oxide coated reactor. A further test was made in which the methane reacted was approximately the same as in the above test. It was found that when no HCl was used, the reaction would proceed at 1500° F., when the contact time was approximately the same as in the above examples. However, both the yield and selectivity of formaldehyde were lower than in the test made with HCl.

Still further tests were made. In these tests, HCl was used. However, the reaction was carried out in a reactor which did not have a lead oxide coating. The methane burned to CO and $CO_2$ and no formaldehyde was formed.

From the foregoing tests, it is clear that the inclusion of the HCl along with the use of the lead oxide coated reactor provides a process for producing formaldehyde from the oxidation of a gaseous hydrocarbon feed which occurs at a much lower temperature than when no HCl is added. As a matter of fact, at these lower temperatures, the gaseous hydrocarbons will not react with the oxygen if no HCl is included. It is further clear from the above tests that even with the relatively long residence time of 1.5 seconds, which occurs at a low yield and low selectivity as indicated by points 50 and 51, respectively of FIG. 2, the yield and selectivity using the combination of both the HCl and the lead oxide coated reactor, is greater than the yield and selectivity when no HCl is included. The reaction temperature necessary when no HCl is included is also much higher.

It is further clear that if HCl is added, but the reaction occurs in a reactor with no lead oxide coating, no formaldehyde is obtained.

Chlorine or a chlorine-containing compound such as $CH_3CH_2Cl$ may be used instead of HCl.

At the temperature of the tests an equilibrium exists:

$$2HCl + \tfrac{1}{2}O_2 = Cl_2 + H_2O$$

Thus, it doesn't matter whether HCl or $Cl_2$ is added. Furthermore, if a chlorine-containing compound (e.g., $CH_3CH_2Cl$) is added, this compound is immediately oxidized to liberate $Cl_2$. We theorize that the $Cl_2$ thus formed reacts with $CH_4$ to give a methyl radical and a chlorine atom.

$$CH_4 + Cl_2 = CH_3 + Cl + HCl$$

This starts a reaction chain leading to production of $CH_2O$. Since $Br_2$ is known to react with methane also, and since the equilibrium shown above for $HCl + O_2$ holds also for $HBr + O_2$, then bromine, HBr, or bromine-containing compounds will also work. The reaction conditions are the same for these other compounds as for HCl.

I claim:
1. A continuous process for producing formaldehyde comprising the steps of: passing a feed containing essentially methane through liquid hydrochloric acid; mixing the resulting gases with a gas containing free oxygen; heating the mixture for a period of time ranging from about .5 to 1.5 seconds in a reactor having lead oxide coated surfaces, the temperature ranging from 900° F. to 1300° F., to partially oxidize the hydrocarbons into gaseous products including formaldehyde; and recovering the formaldehyde.

2. A continuous process in accordance with claim 1 wherein the unused feed is recycled.

3. A continuous process in accordance with claim 2 wherein the gas containing free oxygen is air.

References Cited in the file of this patent
UNITED STATES PATENTS

| | | |
|---|---|---|
| 1,697,105 | Carman | Jan. 1, 1929 |
| 1,697,106 | Carman et al. | Jan. 1, 1929 |
| 1,776,771 | Boomer | Sept. 30, 1930 |
| 2,244,210 | Nashan | June 3, 1941 |